United States Patent [19]

Niehaus et al.

[11] Patent Number: 5,419,191
[45] Date of Patent: May 30, 1995

[54] APPARATUS FOR COUNTING CYCLES OF FLUID FLOW

[75] Inventors: K. Lynn Niehaus, Manchester; Kevin L. Newcomer, Monroe, both of Mich.

[73] Assignee: QED Environmental Systems, Inc., Ann Arbor, Mich.

[21] Appl. No.: 38,458

[22] Filed: Mar. 29, 1993

Related U.S. Application Data

[63] Continuation-in-part of Ser. No. 931,267, Aug. 17, 1992.

[51] Int. Cl.⁶ .................................................. G01F 3/20
[52] U.S. Cl. ........................................ 73/264; 235/94 R
[58] Field of Search ................... 73/252, 239, 198, 248, 73/250, 262, 269, 270, 271; 235/94 R; 377/21

[56] References Cited

U.S. PATENT DOCUMENTS

| | | | |
|---|---|---|---|
| 4,051,724 | 10/1977 | Segal et al. ............................. | 73/198 |
| 4,257,751 | 3/1981 | Kofahl .................................... | 410/394 |
| 4,489,779 | 12/1984 | Dickinson et al. ..................... | 166/64 |
| 4,585,060 | 4/1986 | Bernardin et al. ..................... | 166/64 |
| 4,594,890 | 6/1986 | Boker, Jr. .............................. | 73/269 X |
| 4,727,936 | 3/1988 | Mioduszewski et al. ............. | 166/53 |
| 4,848,148 | 7/1989 | Capriatti et al. ...................... | 73/262 |

*Primary Examiner*—Thomas P. Noland
*Attorney, Agent, or Firm*—Harness, Dickey & Pierce

[57] ABSTRACT

A counting apparatus which is designed to be placed in parallel to a fluid flow line has a differential pressure switch which is placed across an orifice positioned within the fluid flow line. A counting mechanism is associated with the differential pressure switch to register a count when signaled by the differential pressure switch. The differential pressure switch is operable to react to the difference in pressure across the orifice to signal the counter to register a count. The orifice can be a fixed or a variable orifice. In another embodiment of the invention, a fixed or variable orifice is placed within the diaphragm of a diaphragm type differential pressure switch to adapt the differential pressure switch to be placed in series with the fluid flow line rather than in parallel to it.

7 Claims, 5 Drawing Sheets

APPARATUS FOR COUNTING CYCLES OF FLUID FLOW

CROSS REFERENCE TO RELATED APPLICATIONS

This application is a continuation-in-part of U.S. Ser. No. 07/931,267 filed Aug. 17, 1992, entitled "Apparatus for Counting Cycles of Fluid Flow".

FIELD OF INVENTION

The present invention relates to a counter for cycles of fluid flow. More particularly, the present invention relates to a counter positioned in series or in parallel with a fluid supply line incorporating a fixed or variable orifice for counting the number of times fluid flow is cycled through a pulsed fluid system.

BACKGROUND OF THE INVENTION

This invention is directed towards a counter which is designed to be placed in series or in parallel with a fluid supply line of a pulsed fluid system. The counter will monitor the number of cycles that fluid flows through the supply line in the pulsed fluid system. A pulse cycle in a pulsed fluid system begins when fluid starts to flow through the fluid supply line. The pulse cycle is completed when the fluid flow through the fluid supply line ceases.

Various devices utilize pressurized fluids to power or operate the particular device. When the device is a machine or apparatus which cycles, the number of times the apparatus cycles may need to be known. A typical example of a cycling apparatus which is powered by a pressurized fluid (normally compressed air) and has the requirement of cycle counting is a pneumatic pump for taking samples of groundwater or other liquids from a well or other monitoring site.

While the present invention is being described for exemplary purposes utilized with a groundwater sampling pump powered by compressed air, it is to be understood that the present invention can be utilized for counting cycles with any type of on/off fluid flow cycling device.

A groundwater sampling apparatus, preferably powered by compressed air, for use in conjunction with the present invention is disclosed in U.S. Pat. No. 4,489,779 issued Dec. 25, 1984 to Dickenson et al. and U.S. Pat. No. 4,585,060 issued Apr. 29, 1986 to Bernardin et al. both the disclosures of which are hereby incorporated by reference. The groundwater sampling apparatus disclosed in the above referenced patents is submerged beneath the water level of the groundwater in a well or monitoring site to a suitable depth for obtaining accurate and representative groundwater samples. The apparatus has a first chamber which is in communication with the groundwater and a second chamber which is in communication with a source of pressurized activating fluid (normally compressed air). The first and second chambers are separated by a flexible bladder member. The sample groundwater is conveyed through the apparatus by alternately pressurizing and venting or relieving the pressure in the second chamber which contracts and relaxes the bladder member. The contracting and relaxing of the bladder member will then alternately decrease and increase the volume of the first chamber. Sample groundwater is drawn into the first chamber during the increase in volume under the influence of natural hydrostatic head of the groundwater and is discharged through the pump outlet during the decrease in volume, thereby conveying the sample groundwater through the pump.

When taking samples of groundwater, it is first necessary to purge the water in the well or monitoring site in order to get a representative sample of the groundwater. The volume of groundwater in the well or monitoring site will normally be purged 3 to 5 times prior to taking a sample of the groundwater. Purging the volume of groundwater within the well 3 to 5 times requires a relatively large number of cycles of the pump. In order to be able to effectively and consistently retrieve acceptable groundwater samples, a person must accurately know the number of cycles the pump has gone through.

Accordingly, what is needed is an apparatus for counting the cycles of a fluidic activated device which is operated by a cyclical on and off flow of the operating fluid.

SUMMARY OF THE INVENTION

The present invention discloses a counting apparatus which is designed to be located in any position in series or in parallel with a fluid flow line across a fixed or variable orifice in a pulsed fluid system. One embodiment of the apparatus which is placed in series with the fluid supply line has a switching mechanism system in a fluid chamber of the body of the apparatus. As the fluid passes through the fluid chamber, the switching mechanism is forced through the fluid chamber by the fluid flow. The switching mechanism communicates with a totalizing counter causing the counter to increase the total count. When the fluid flow is stopped, a spring returns the switching mechanism to its original position allowing the totalizing counter to reset for the next cycle.

Another embodiment of the invention employs a totalizing counter and a differential pressure switch paced in parallel with a fluid flow line across a fixed or variable orifice placed in the fluid flow line to detect cycles in the pulsed fluid flow line. As described above, a cycle in a pulsed fluid system begins when fluid starts to flow through the system. As the fluid flows through the fixed or variable orifice, a differential pressure occurs across the orifice. When the differential pressure across the orifice is greater than the threshold pressure of the differential pressure switch which is placed across the orifice, the differential pressure switch moves from its unswitched state to its switched state. When entering the switched state, the differential pressure switch signals the totalizing counter, causing the totalizing counter to increment its totalized count. The pulse cycle is completed when fluid flow through the fixed or variable orifice ceases. Because no fluid flows, no differential pressure exists across the orifice. The lack of differential pressure across the orifice causes the differential pressure switch to return to its unswitched state.

Other advantages and objects of the present invention will become apparent to those skilled in the art from the subsequent detailed description, appended claims and drawings.

BRIEF DESCRIPTION OF THE DRAWINGS

The above mentioned and other features and objectives of this invention and the manner of attaining them will become more apparent and the invention will be better understood by reference to the following description of the invention taken in conjunction with the accompanying drawings wherein.

DETAILED DESCRIPTION OF THE PREFERRED EMBODIMENT

Figures 1, 2:
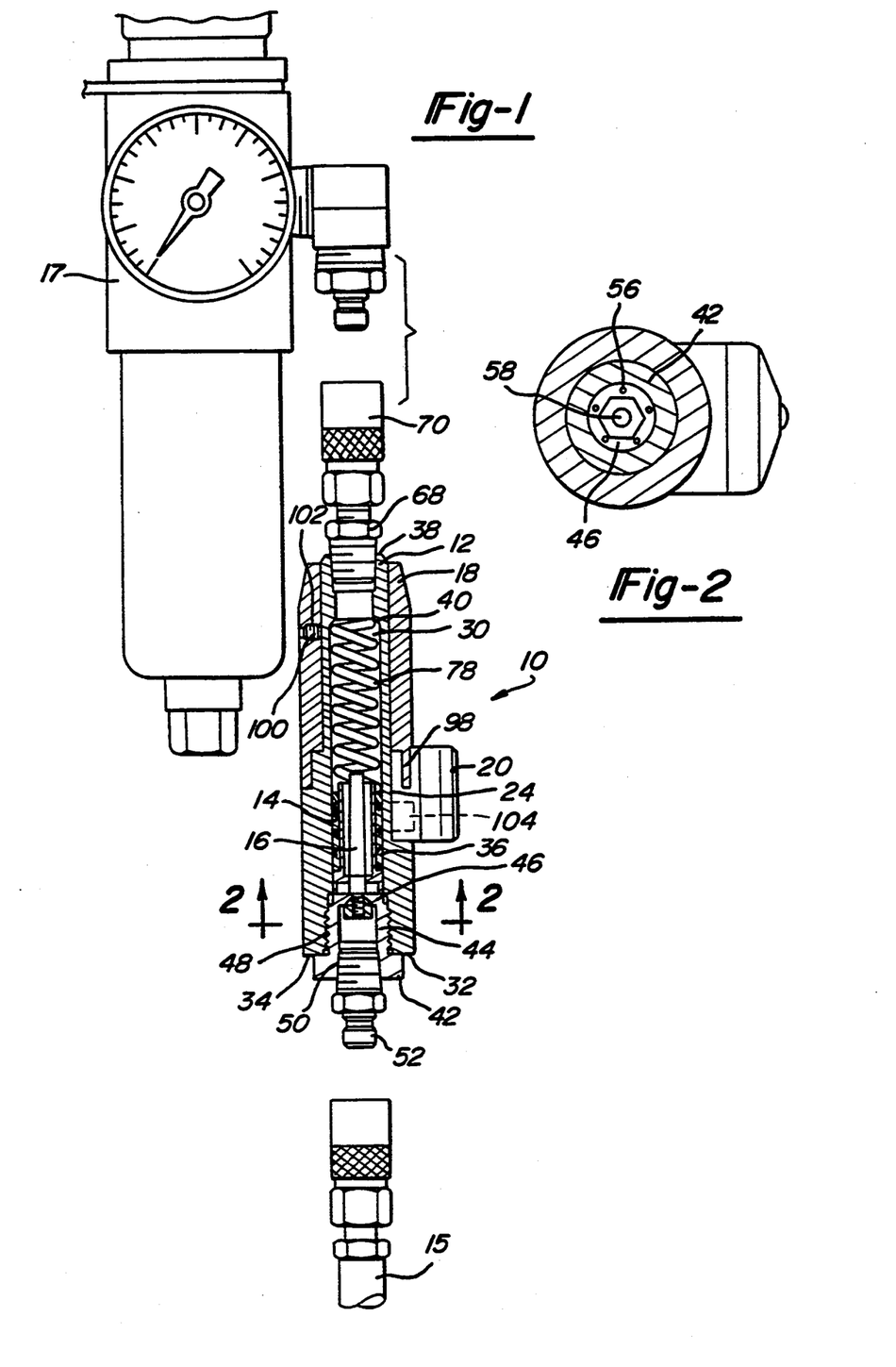
FIG. 1 is a longitudinal side view partially in cross section of a fluid flow counter in accordance with the present invention.
FIG. 2 is a sectional view taken along line 2—2 of FIG. 1.
Figures 3, 4:
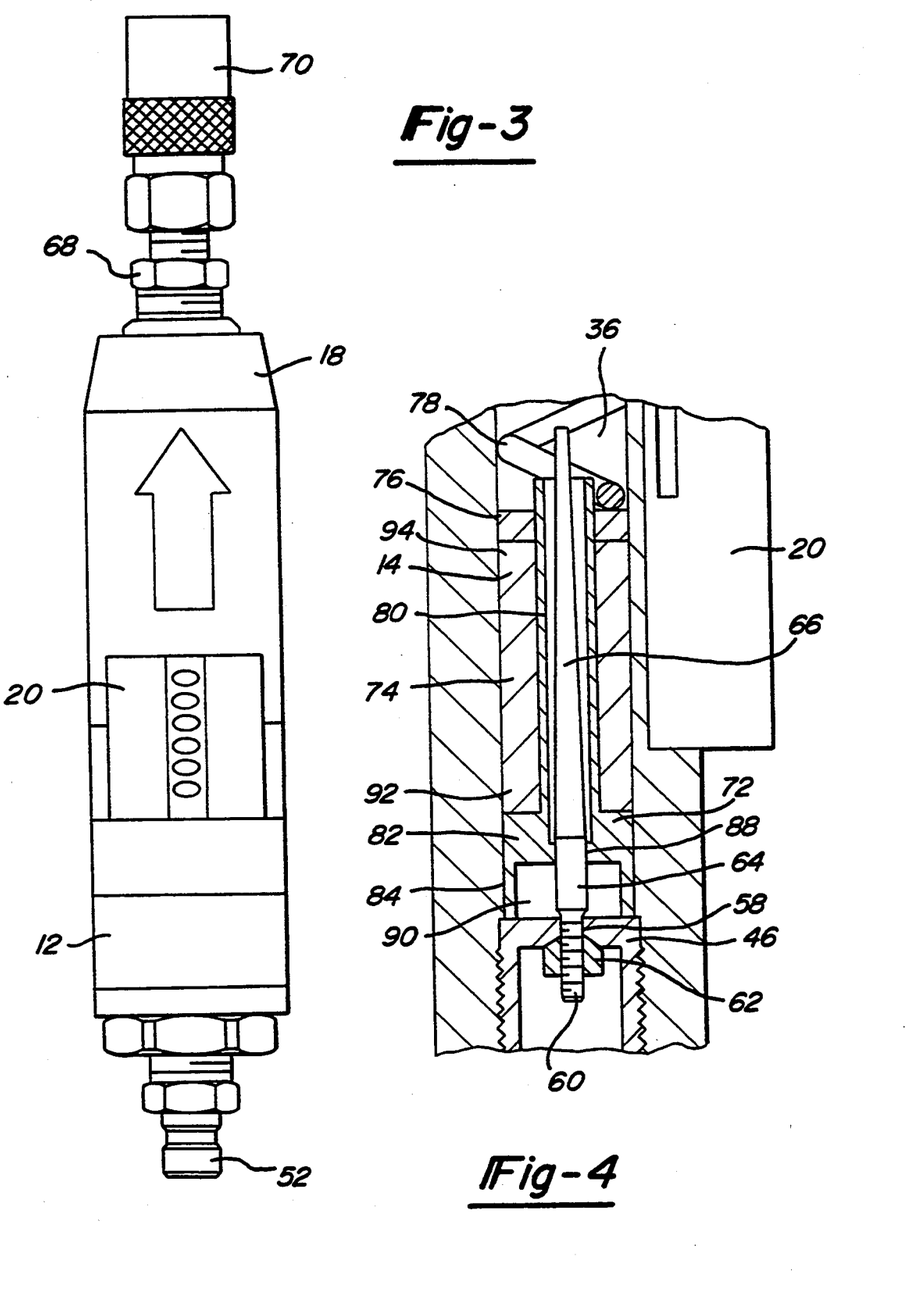
FIG. 3 is another longitudinal side view of the fluid flow counter shown in FIG. 1.
FIG. 4 is an enlarged partially cross sectional view showing the internal mechanism of the counter shown in FIG. 1.

Referring now to FIGS. 1 through 4, a fluid flow cycle counter in accordance with the present invention is shown and is designated by the reference numeral 10. Fluid flow counter 10 is designed to be placed in series between a fluid supply line 15 going to a source of fluid and a device 17 which is operated by the flow of the fluid. In the case of FIG. 1, the device 17 is shown as a pressure regulator which is attached to the operated device. The fluid flow counter 10 comprises an inner housing 12, a magnetic slide assembly 14, a tapered pin 16, an outer housing 18 and a magnetically actuated mechanical counter 20.

Inner housing 12 is a generally cylindrical housing having a generally planar mounting surface 24 for magnetic counter 20. Inner housing 12 defines a generally cylindrical passage 30 extending completely through inner housing 12 and having a first threaded end 32 located on an input side 34 of fluid flow counter 10. First threaded end 32 leads into a cylindrical bore 36 extending longitudinally within inner housing 12. Located on the end of cylindrical bore 36 opposite to that of first threaded end 32 is second threaded end 38. Second threaded end 38 is located at the output end of fluid flow counter 10. Located at the junction of cylindrical bore 36 and second threaded end 38 is spring seat 40.

An input fitting 42 is threadably engaged in first threaded end 32 of cylindrical passage 30. Input fitting 42 has an annular section 44 and an end wall 46. The external surface 48 of annular section 44 is threaded for engagement with first threaded end 32. The internal surface, 50 of annular section 44 is also threaded and is adapted to be mated with an appropriate fluid flow fitting 52 for quick connect and disconnect from fluid flow supply line 15. End wall 46 is located on the end of annular section 44 disposed within cylindrical passage 30. End wall 46 has a plurality of holes 56 including a centrally located hole 58 extending completely through end wall 46.

Disposed within centrally located hole 58 is tapered pin 16. Tapered pin 16 has a threaded end 60 which extends through hole 58 and is fixedly secured to end wall 46 by a threaded nut 62. While the present invention shows tapered pin 16 secured to end wall 46 by threaded nut 62, it is understood that tapered pin 16 may be integral with end wall 46 or fixedly secured to end wall 46 by any means well known in the art. Tapered pin 16 has a cylindrical section 64 located adjacent threaded end 60 and a tapered partially conical section 66 which extends from cylindrical section 64 longitudinally within cylindrical bore 36.

An output fitting 68 is threadably engaged in second threaded end 38 of cylindrical passage 30. Output fitting 68 is annular in shape with an external surface threaded for engagement with second threaded end 38. The internal surface is also threaded and is adapted to be mated with an appropriate fluid flow fitting 70 for quick connect and disconnect from device 17.

Disposed within cylindrical bore 36 between input fitting 42 and output fitting 68 is magnetic slide assembly 14. Magnetic slide assembly 14 is comprised of an inner sleeve 72, a magnet 74, an upper sleeve 76 and a spring 78.

Inner sleeve 72 has an annular section 80 and a flange 82 located at the end of annular section 80 adjacent to input fitting 42. Flange 82 has an external surface 84 which is guided by the interior surface of cylindrical bore 36. The internal surface 88 of flange 82 is adapted to slidably engage cylindrical section 64 of tapered pin 16 and together they form a fluid chamber 90.

Magnet 74 is an annular magnet having a south pole 92 disposed towards input fitting 42 and a north pole 94 disposed towards output fitting 68. Magnet 74 is disposed around annular section 80 of inner sleeve 72 adjacent to flange 82 of inner sleeve 72 and is guided by cylindrical bore 36 located in inner housing 12. Inner housing 12 is constructed from a non-magnetic material, preferably aluminum, such that magnetic slide assembly 14 is free to slide longitudinally in cylindrical bore 36. Located at the end of magnet 7.4 opposite to the end adjacent to flange 82 is upper sleeve 76. Upper sleeve 76 is also disposed around annular section 80 of inner sleeve 72 and is guided by cylindrical bore 36 located in inner housing 12. Spring 78 is disposed within cylindrical bore 36 between upper sleeve 76 and output fitting 68. Spring 78 is seated on spring seat 40 and urges magnetic slide assembly 14 toward input fitting 42 by bearing against upper sleeve 76.

Outer housing 18 is an annular housing and is disposed around the output end of inner housing 12. Outer housing 18 locates and secures magnetic counter 20 to the outside of inner housing 12. Counter 20 is secured between outer housing 18 and inner housing 12 by engagement with flange 98 of outer housing 18. A set screw 100 located in a threaded bore 102 within outer housing 18 locks outer housing 18 to inner housing 12.

Magnetic counter 20 is of a design well known in the art and has a magnet 104 which is used to activate an arm which works through a plurality of gears to rotate a counter dial. Magnetic counter 20 is mounted on planar surface 24 of inner housing 12 such that the north pole of magnet 104 is positioned adjacent to inner housing 12. Counter 20 requires two movements to register a counted cycle. The first movement causes the counter dial to register an additional count. The second movement causes the mechanism to reset in preparation for again registering an additional count. A typical counter of the one described above is manufactured by Hengstler.

In operation, the fluid flow counter 10 of the present invention is connected in series to a fluid flow supply line 15 such that the fluid enters the counter 10 at input fitting 42 and exits the counter 10 at output fitting 68.

Fluid flow enters the fluid flow counter 10 through input fitting 42 and enters fluid chamber 90 through the plurality of holes 56. The fluid flow creates a fluid pressure in chamber 90 which acts against magnetic slide assembly 14 which then moves longitudinally within cylindrical bore 36 against the load imposed by spring 78. As movement of magnetic slide assembly 14 continues down the length of tapered pin 16 a greater amount of fluid will pass between partially conical section 66 of tapered pin 16 and the internal surface 88 of flange 82 in magnetic slide assembly 14 as the spacing between these two pieces increases due to the conical section 66 of tapered pin 16. This movement of magnetic slide assembly 14 will continue until an equilibrium between the load created by the fluid pressure and the load created by spring 78 is reached. The maximum movement of magnetic slide assembly 14 is determined by the solid height of spring 78. The amount of fluid movement which is required to move magnetic slide assembly 14 can be varied by varying the size of cylindrical section 64 and internal surface 88, the amount of taper in tapered pin 16 or the strength of spring 78.

As the magnetic slide assembly 14 moves past the area where the magnetic counter 20 is positioned, the south pole 92 of magnet 74 attracts the north pole of magnet 104 in magnetic counter 20 and mechanically changes the number shown on magnetic counter 20. When the fluid flow is stopped, spring 78 returns magnetic slide assembly 14 to its position adjacent to input fitting 12. This return movement of magnetic slide 14 resets the counter 20 by the attraction and movement of the north pole of magnet 104 by south pole 92 of magnet 92. Thus the counter 20 has counted one cycle of on/off fluid flow and is now positioned to react to the next cycle of fluid flow.

The orientation of the magnetic poles in the above example were arbitrarily selected. The location of specific poles of magnets can be varied by those skilled in the art to achieve the same operation as described above.

Figures 5, 6:
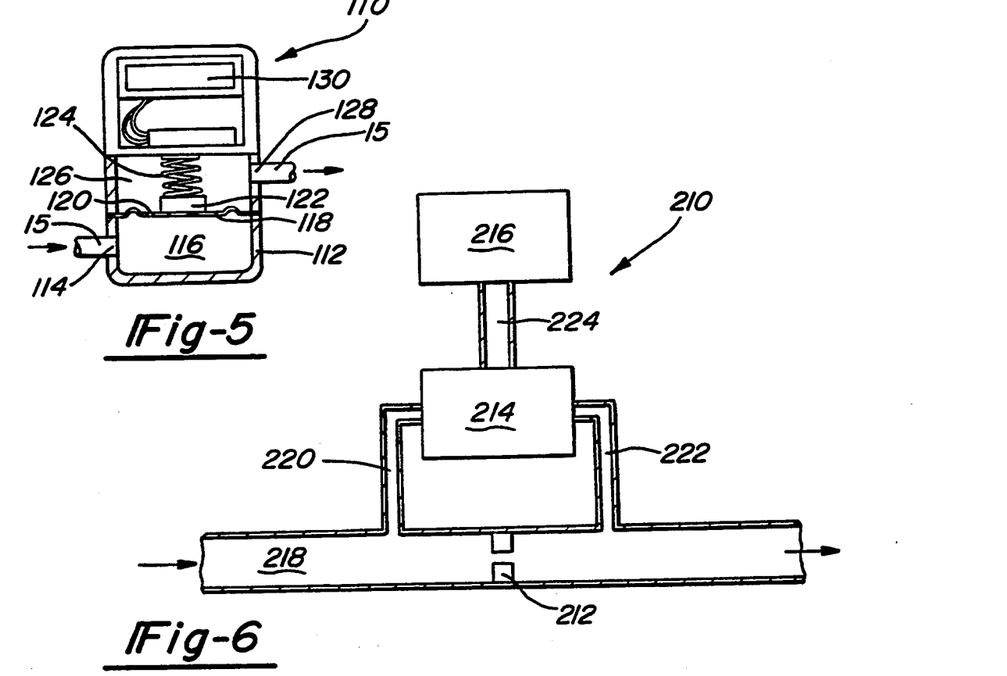
FIG. 5 is a view partially in cross section showing a diaphragm design of differential pressure switch having the orifice located within the diaphragm.
FIG. 6 is a schematic view showing the general principal of another embodiment of the present invention.

Referring now to FIG. 5, a fluid flow counter according to another embodiment of the present invention is shown and is designated by the reference numeral 110. Fluid flow counter 110 is a diaphragm type of fluid flow counter which is designed to be placed in series with the fluid flow. Fluid flow counter 110 comprises a housing 112 within which is contained an inlet port 114 leading to an inlet chamber 116, a diaphragm 118 having a fixed or variable orifice 120, a switching mechanism 122, a return spring 124, an outlet chamber 126 having an outlet port 128, and a totalizing counter 130.

The operation of differential pressure switch 110 is similar to that described above for FIGS. 1 through 4. Fluid flow counter 110 is connected in series to fluid supply line 15 such that fluid enters counter 110 as indicated by the arrows in FIG. 5 through inlet port 114 and enters inlet chamber 116. The fluid continues its flow through orifice 120 into outlet chamber 126 and into a continuation of supply line 15 through outlet port 128. The fluid pressure within inlet chamber 116 will be greater than the fluid pressure within outlet chamber 126 due to the fluid flow through orifice 120. The difference in pressure between chamber 116 and 126 acts against diaphragm 118 forcing diaphragm 118 and switching mechanism 122 in an upward direction as shown in FIG. 5. When switching mechanism 122 reaches its upward switched position, totalizing counter 130 is signaled and totalizing counter 130 increments its total count by one. When fluid flow through counter 110 ceases, the fluid pressure within chambers 116 and 126 again equalizes and return spring 124 urges diaphragm 118 and switching mechanism 122 into its lower or unswitched position.

Referring now to FIGS. 6 through 12 there is shown in FIG. 6 a schematic diagram representing an apparatus 210 which is placed in parallel with the fluid supply line for counting cycles of fluid flow. Apparatus 210 comprises a fixed or variable orifice 212, a differential pressure switch 214 and a totalizing counter 216. Orifice 212 is positioned within a fluid supply line 218. Orifice 212 can be a fixed orifice or a variable orifice. The variable orifice allows for the adjustment of the differential pressure drop across the orifice to compensate for various fluid flows, pressures and lengths of tubing or other connecting devices between the fluid source, totalizing counter 216's location and the device (not shown) that is consuming the fluid.

Differential pressure switch 214 is positioned in parallel with supply line 218 and is in communication with supply line 218 on each side of orifice 212 by pressure lines 220 and 222. Totalizing counter 216 is in communication with differential pressure switch 214 and receives a signal from differential pressure switch 214 through a connection 224 which can be either electrical such as wires, mechanical such as mechanical linkages, magnetic such as opposing magnets or a combination of these depending on the type of totalizing counter 216 and differential pressure switch 214 chosen for specific applications.

Initially there is no fluid flow through supply line 218. When there is an absence of fluid flow, the fluid pressure in pressure lines 220 and 222 is identical. Differential pressure switch 214 is in an unswitched position as there is no pressure differential across it. A pulse cycle in the fluid supply system begins when fluid starts to flow through supply line 218 as indicated by the arrows in FIG. 6 and through variable or fixed orifice 212, causing a differential pressure to occur across orifice 212. When this differential pressure is greater than the threshold pressure of differential pressure switch 214 which is placed across orifice 212, differential pressure switch 214 enters its switched state. When entering the switched state, differential pressure switch 214 signals totalizing counter 216 through connection 224 causing totalizing counter 216 to increment its total count. The cycle is completed when fluid flow through supply line 218 and thus orifice 212 ceases. Again because no fluid flows, there is no differential pressure across orifice 212 and differential pressure switch 214 returns to its unswitched state.

Figure 7:
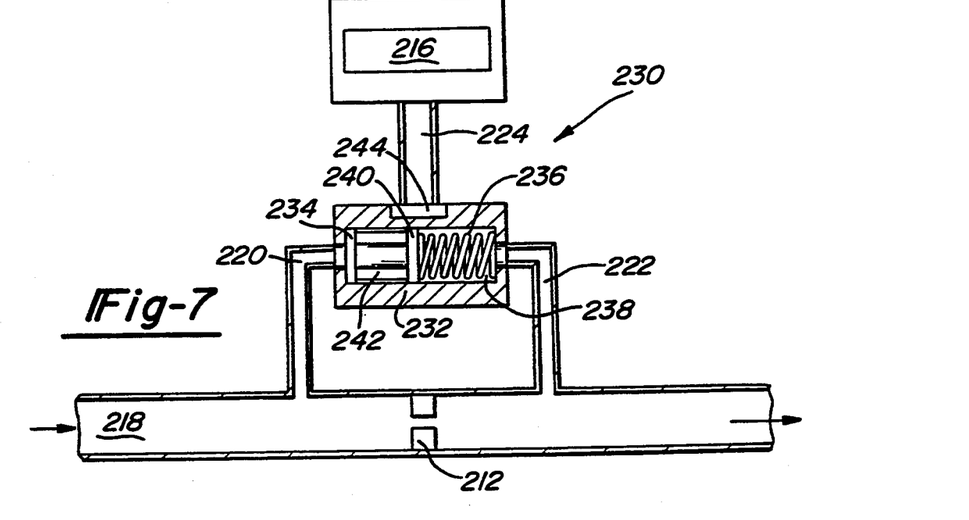
FIG. 7 is a view partially in cross section showing a sliding magnet differential pressure switch.

Differential pressure switch 214 can be one of several styles including a sliding magnetic piston type or a more common diaphragm type. FIG. 7 shows a typical arrangement for the sliding piston type of magnetic differential switch which is designated by the reference numeral 230. Magnetic differential switch 230 comprises a housing 232, a piston 234 and a return spring 236. Housing 232 defines an internal cavity 238 which is in communication at one end with pressure line 220 and is in communication at the opposite end with pressure line 222. Piston 234 is slidingly received within cavity 238 and is free to move between the opposing ends of housing 132. Piston 234 includes at least one circular disk 240 which slidingly engages the interior of cavity 238 to prevent fluid flow between pressure line 220 and pressure line 222. Piston 234 also includes an annular magnet 242 which signals a sensor 244 to activate totalizing counter 216. The sensor 244 can be part of connection 224 or it can be a part of totalizing counter 216 itself. Return spring 236 is positioned within cavity 238 between piston 234 and pressure line 222.

Initially there is an absence of fluid flow through fluid supply line 218. Without fluid flow across orifice 212, the fluid pressure in pressure line 220 and pressure line 222 is identical and return spring 236 urges piston 234 to the left as shown in FIG. 7 towards pressure line 220 and into its unswitched position. The operation of differential pressure switch. 230 begins when fluid flow begins through supply line 218 as indicated by the arrows in FIG. 7, causing the fluid pressure in pressure line 220 to become greater than the fluid pressure in pressure line 222 due to the fluid flow across orifice 212. This higher pressure in pressure line 220 urges piston 234 to the right as shown in FIG. 7 against the load exerted by return spring 236 moving piston 234 to its switched position. This movement of piston 234 causes magnet 242 to pass by and close or open the contacts of sensor 244 signaling totalizing counter 216 to increase its total count. As long as fluid flow continues through supply line 218, piston 234 will remain in this switched position. When fluid flow through supply line 218 ceases, the pressure differential between pressure lines 220 and 222 also ceases and piston 234 is again urged to the left as shown in FIG. 7 by return spring 236 to its unswitched position.

Figures 8, 9:
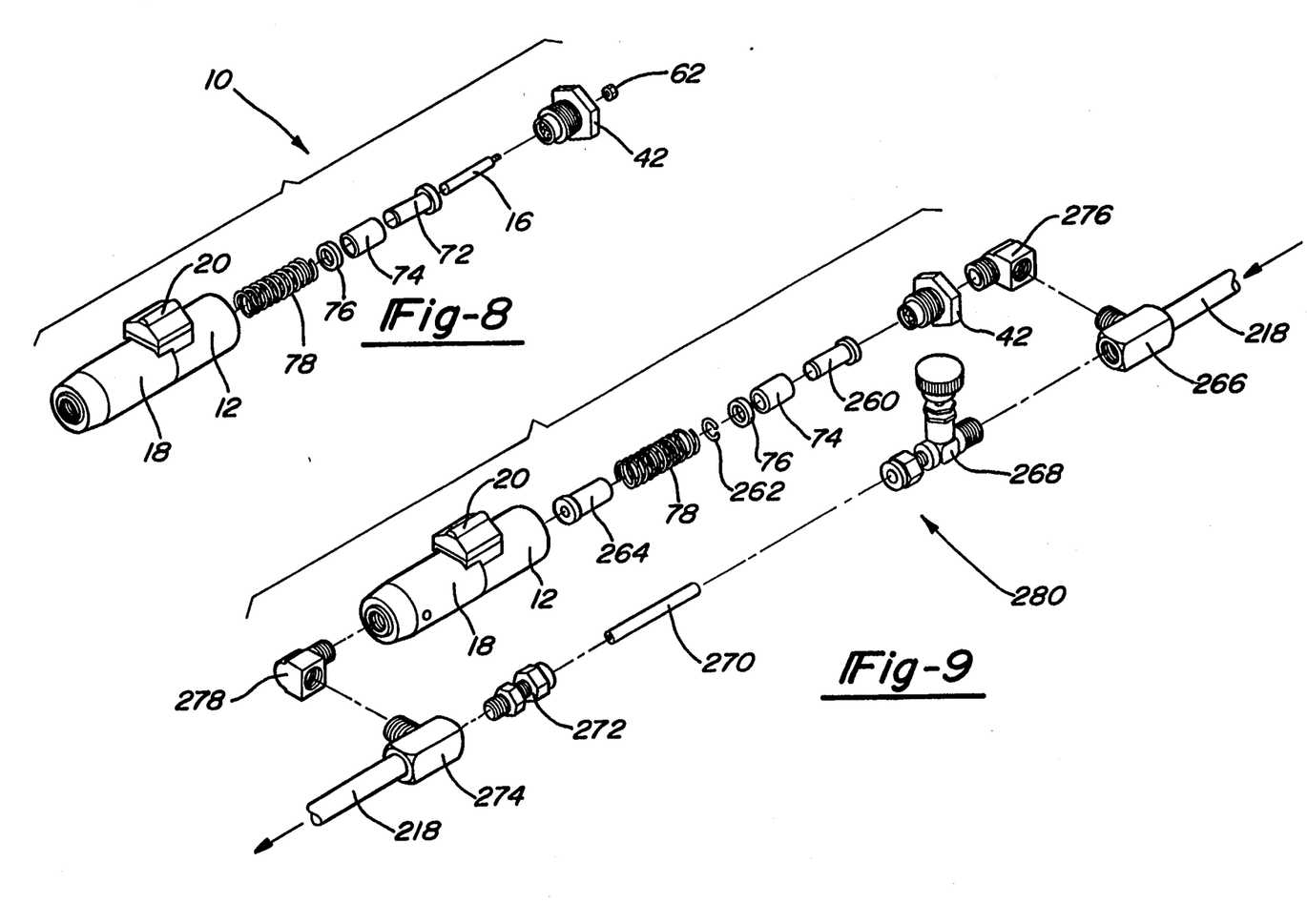
FIG. 8 is an exploded perspective view of the sliding magnet fluid counter shown in FIG. 1.
FIG. 9 is an exploded perspective view of the fluid counter shown in FIG. 8 adapted to be placed in parallel with the fluid supply line.

FIGS. 8 and 9 show the totalizing counter shown in FIGS. 1-4 in an exploded view to aid in the understanding of adapting this fluid flow counter from a counter which is placed in series to a counter which is placed in parallel with the fluid flow. Referring now to FIG. 8, apparatus 10 for counting cycles of fluid flow comprises input fitting 42, tapered pin 16, threaded nut 62 to secure tapered pin 16 to input fitting 42, inner sleeve 72, magnet 74, upper sleeve 76, spring 78, inner housing 12, upper housing 18, and magnetic mechanical counter 20. As described above for FIGS. 1 through 4, the apparatus is placed in series with the fluid flow by having the fluid flow enter input fitting 42 causing inner sleeve 72 and magnet 74 to move within housing 12 against the load of spring 78 by virtue of the pressure differential created by tapered pin 16 being positioned within an aperture in inner sleeve 72. As magnet 74 passes through the magnetic flux caused by the magnet within magnetic counter 20, magnetic counter 20 registers an additional count. The fluid flow continues to pass through housing 12 and exits the counter through an outlet opening in inner housing 12. When fluid flow is terminated, spring 78 again urges inner sleeve 72 and magnet 74 back towards input fitting 42.

FIG. 9 shows the changes necessary in order to adapt the apparatus shown in FIG. 8 for use as a counter placed in parallel with the fluid flow according to the present invention. The adapted counter, reference numeral 280, has tapered pin 16, threaded nut 62 and inner sleeve 72 removed from the assembly. In their place, a guide 260, a retainer 262 and a stop 264 are added. Guide 260 is a solid cylindrical member having an annular flange on one end thereof. The annular flange slidingly engages the interior bore of inner housing 12 and together with upper sleeve 76 create a fluid seal between the ends of housing 12. Fluid supply line 218 is supplied with a tee 266, a fixed or variable orifice 268, a connecting tube 270, a connector 272 and a second tee 274. Tee 266 and tee 274 are used to connect the apparatus in parallel by the use of a pair of elbows 276 and 278 as shown in FIG. 9. Once adapted, apparatus 280 is now capable of performing the differential pressure switch function and the totalizing counting function of the present invention when placed in parallel with the fluid flow supply line.

Without fluid flow through supply line 218 and across orifice 268, the fluid pressure through tee 266 is identical to the fluid pressure through tee 274. Spring 78 urges guide 260 and magnet 74 towards input fitting 42 or to the right as shown in FIG. 9. This defines the unswitched position for differential pressure switch 280. When fluid flow begins through supply line 218 as indicated by the arrows in FIG. 9, the fluid pressure through tee 266 will be greater than the fluid pressure through tee 274 due to orifice 268. This pressure difference will be fixed with a fixed orifice and adjustable with a variable orifice. The higher pressure through tee 266 will move guide 260 and magnet 74 to the left as shown in FIG. 9 against the load exerted by spring 78. This movement causes magnet 74 to pass through the magnetic flux of the magnet in counter 20 causing counter 20 to enter its switched position and register an additional count. When fluid flow ceases, the fluid pressure through tees 266 and 272 again becomes equal and spring 78 urges guide 260 and magnet 74 back to its unswitched position or to the right as shown in FIG. 9.

Figure 10:
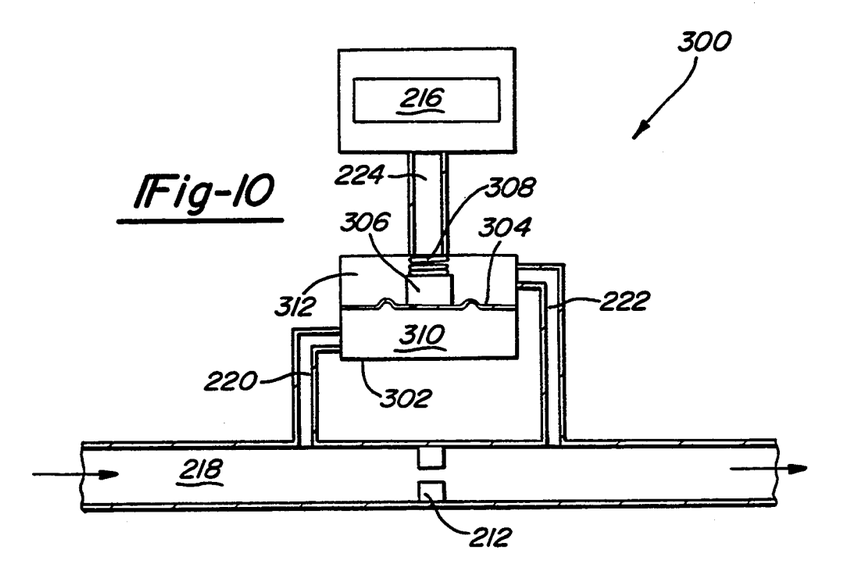
FIG. 10 is a schematic view partially in cross section showing a diaphragm design of differential pressure switch.

Referring now to FIG. 10, another embodiment of differential pressure switch is shown and is designated by the reference numeral 300. Differential pressure switch 300 is a diaphragm type of differential pressure switch and it includes a housing 302, a flexible diaphragm 304, a switching mechanism 306 and a return spring 308. Diaphragm 304 is located within housing 302 such that housing 302 is divided into two chambers, a high pressure chamber 310 and a low pressure chamber 312. Pressure line 220, the fluid line in communication with supply line 218 prior to or in front of orifice 212, is in communication with high pressure chamber 310. Pressure line 222, the fluid line in communication with supply line 218 after orifice 212, is in communication with low pressure chamber 312. Return spring 308 urges switching mechanism 306 and diaphragm 304 into a downward unswitched position as shown in FIG. 10. This position is maintained as long as there is no fluid flow through supply line 218 and thus no fluid flow across orifice 212. The lack of fluid flow across orifice 212 equalizes the pressure in pressure lines 220 and 222 which in turn equalizes the pressure within chambers 310 and 312.

When fluid flow begins through supply line 218 as indicated by the arrows in FIG. 10, the fluid pressure within pressure line 220 and pressure chamber 310 will be higher than the fluid pressure within pressure line 222 and pressure chambers 312 due to the fluid flow across orifice 212. The higher pressure in pressure chamber 310 will move diaphragm 304 and switching mechanism 306 upward as shown in FIG. 10 against the force exerted by return spring 308. The upward movement of switching mechanism 306 will cause switching mechanism 306 to move into a switched position where it is in communication with totalizing counter 216 causing totalizing counter 216 to increment the total count by one. The termination of fluid flow through supply line 218 and across orifice 212 will again equalize the fluid pressure between pressure line 220 and pressure line 222 as well as between pressure chamber 310 and pressure chamber 312. Return spring 308 will then urge switching mechanism 306 and diaphragm 304 back into their downward unswitched position.

Figure 11:
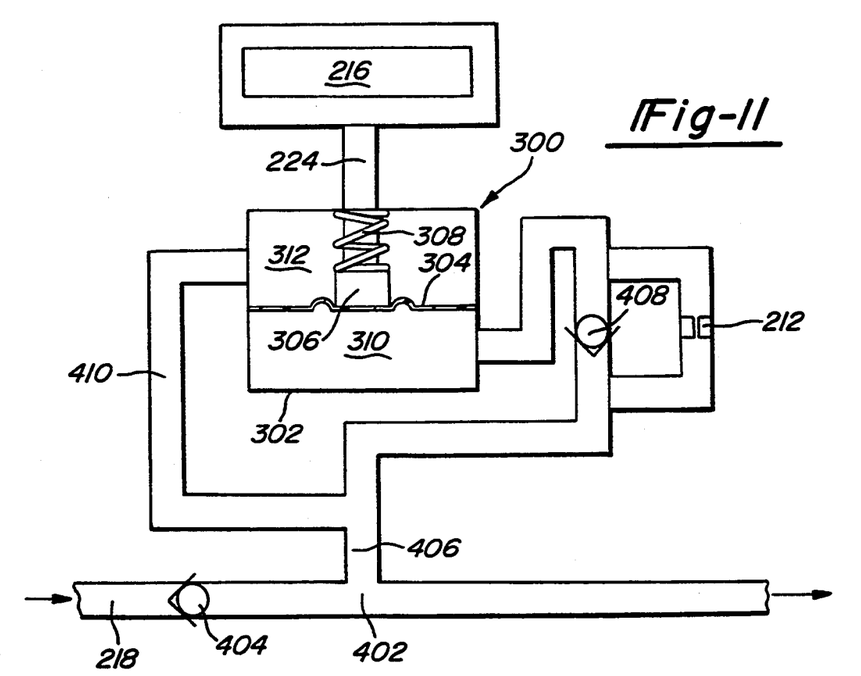
FIG. 11 is a schematic view showing a diaphragm design of differential pressure switch which can be connected to the fluid supply line by using only one tee connector.

Referring now to FIG. 11, differential fluid counter 300 is shown connected to supply line 218 by using only a single tee 402. Supply line 218 has an optional check valve 404 to create a more defined pressure drop while keeping out any pulsing signals that may occur, such as from a second pump placed on the same supply line. The fluid supply pressures are then picked up through the single tee 402 and a single pressure line 406.

Pressure line 406 extends from supply line 218 to pressure chamber 310. A second check valve 408 is placed between supply line 218 and differential pressure switch 300 to permit flow from supply line 218 to pressure switch 300. Check valve 408 will not allow fluid flow in the opposite direction. Fixed or variable orifice 212 is connected to pressure line 406 by being placed across check valve 408. Thus, any flow of fluid from pressure chamber 310 to fluid supply line 218 will go through orifice 212.

An additional pressure line 410 is connected between fluid supply line 218 and pressure chamber 312 by being connected to pressure line 406 between fluid supply line 218 and check valve 408. The operation of this system is similar but somewhat different than that described for the above embodiments. Without fluid flow through supply line 218, the pressure within pressure chamber 310 and pressure chamber 312 is equal and return spring 308 urges switching mechanism 306 and diaphragm 304 into a downward unswitched position as shown in FIG. 11.

When fluid begins to flow through supply line 218 as indicated by the arrows in FIG. 11, the fluid pressure within pressure chamber 310 and pressure chamber 312 will still remain equal. This is due to the fluid flow through pressure line 406 and check valve 408 as well as the fluid flow through pressure line 410. When fluid flow to supply line 218 is terminated, the fluid pressure in pressure line 410 and chamber 312 will rapidly drop off while the fluid pressure in pressure chamber 310 and pressure line 406 above orifice 212 and check valve 408 will gradually be reduced due to the requirement of the fluid to flow through orifice 212. The difference in fluid pressures between pressure chamber 310 and 312 will act against diaphragm 304 causing an upward movement of diaphragm 304 and switching mechanism 306 against the force exerted by return spring 308. This upward movement will cause switching mechanism 306 to move into its switched position signaling totalizing counter 216 to increment the total count by one. When the fluid pressure in chamber 310 is allowed to bleed through orifice 212, the pressure in pressure chambers 310 and 312 will again become equal and the device is positioned to register additional pulsed cycles.

While the above detailed description describes the preferred embodiment of the present invention, it should be understood that the present invention is susceptible to modification, variation and alteration without deviating from the scope and fair meaning of the subjoined claims.

What is claimed is:

1. An apparatus for counting on/off cycles of a fluid flow, said apparatus comprising:
   a housing defining an internal passageway;
   a flexible diaphragm disposed within said internal passageway, said diaphragm dividing said internal passageway into an inlet chamber and an outlet chamber, said diaphragm movable from a first position to a second position in response to a fluid pressure differential between said inlet chamber and said outlet chamber caused by said fluid flow;
   an orifice extending through said flexible diaphragm;
   means for counting operably associated with said flexible diaphragm such that said counting means registers a count in response to each on/off cycle of said fluid flow.

2. The apparatus claimed in claim 1 wherein said orifice is a fixed orifice.

3. The apparatus claimed in claim 1 wherein said orifice is a variable orifice.

4. The apparatus claimed in claim 1 further comprising means for biasing said flexible diaphragm into said first position.

5. The apparatus claimed in claim 4 wherein said biasing means is a coil spring.

6. The apparatus of claim 1 wherein said diaphragm activates said counting means when moving from said first position to said second position.

7. The apparatus of claim 1 wherein said diaphragm resets said counting means when moving from said second position to said first position.

* * * * *